C. H. ENDEBROCK & W. H. MAHLOW.
PACKING RING.
APPLICATION FILED APR. 30, 1914.
1,211,692.
Patented Jan. 9, 1917.
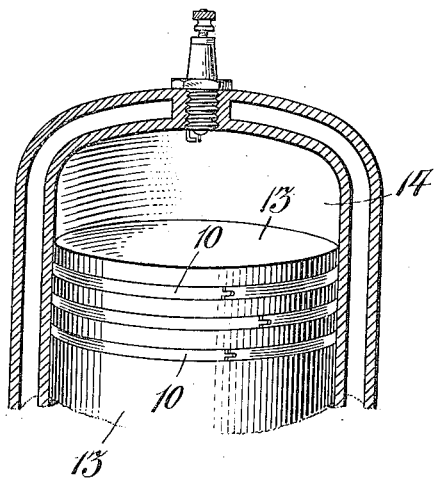
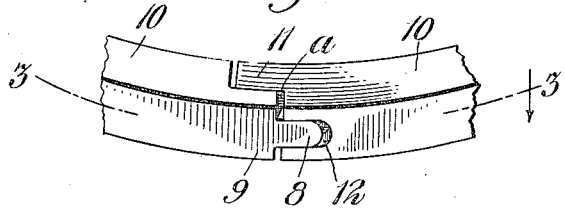
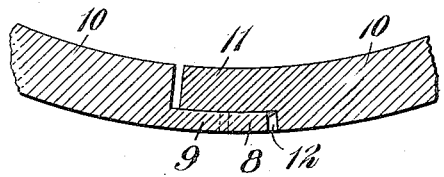
WITNESSES
INVENTORS
Carl H. Endebrock
William H. Mahlow
BY
ATTORNEYS

UNITED STATES PATENT OFFICE.

CARL H. ENDEBROCK AND WILLIAM H. MAHLOW, OF TRENTON, NEW JERSEY; SAID MAHLOW ASSIGNOR TO SAID ENDEBROCK.

PACKING-RING.

1,211,692.   Specification of Letters Patent.   Patented Jan. 9, 1917.

Application filed April 30, 1914.   Serial No. 835,416.

*To all whom it may concern:*

Be it known that we, CARL H. ENDEBROCK and WILLIAM H. MAHLOW, both citizens of the United States, and residents of Trenton, in the county of Mercer and State of New Jersey, have invented a new and Improved Packing-Ring, of which the following is a full, clear, and exact description.

Among the principal objects which the present invention has in view are: to provide a packing ring of the expansion type, the free ends whereof are coupled to form a close-fitting, sealed joint to prevent the seepage or escape of gases or oil therethrough; to provide a ring of the character mentioned with lapped ends correspondingly constructed and arranged, to provide a joint which is completely closed under all working conditions of the ring; to provide a homogeneous split ring, the free ends whereof are shaped to form a lap and dowel connection to seal the passage across said ring; and to provide a single ring having sealed, free matched ends to facilitate the application of rings of this character to engines or the pistons thereof.

*Drawings.*—Figure 1 is a vertical section of a fragment of an internal combustion engine, showing in conjunction therewith a perspective view of a top fragment of a piston therefor, equipped with packing rings constructed and arranged in accordance with the present invention; Fig. 2 is a detail view, on an enlarged scale, showing in perspective the lapped free end of a ring constructed and arranged in accordance with the present invention; Fig. 3 is a section taken on the line 3—3 in Fig. 2.

*Description.*—Packing rings of the character shown in the accompanying drawings are preferably constructed as a single or homogeneous member. The employment of the single member has facilitated the construction thereof, due to the fact that in the manufacture of the single member consideration has been given only to the expansion of said member, and the problem has not been complicated by making provision for a possibly different force and quality of expansion inherent in a second member. In the endeavor to close the passage between the piston and the cylinder, in engines of the type to which the invention is applicable, these rings have been doubled, or two rings, one resting over the other, have been employed, the free or opening ends of said rings being disalined. A favored form of ring heretofore existing has been that in which the ends have been beveled with overhanging surfaces arranged to close the gap incident to the expansion of the ring. The parted ends of the ring also have been cut to form overlapping sections, the parting line whereof is parallel to the plane of the ring. These joints have been found inefficient, the inefficiency being apparently due to the displacement of the rings at the separating points.

The objections above enumerated are avoided in the ring shown in the accompanying drawings, one end of which is provided with a tongue 8. The tongue 8 is extended from a lap portion 9, which lap portion has the full width of the ring 10. The lap portion 9, in service, overlies, to rest upon a lap 11, which is extended from the opposite free end of the ring. The lap 11 and the lap portion 9 have a combined thickness equal to that of the body of the ring 10. In service, said lap portion and said lap frictionally engage, to prevent the seepage or passage between, of gases, oil, etc., which may gain access thereto.

The tongue 8 neatly fits a pocket 12. The sides of the pocket 12 and of the tongue 8 are parallel with the top and bottom edges of the ring, and are snugly fitted to the sides of the pocket 12 to form an oil- and gastight joint therewith. The tongue 8, as seen best in Fig. 3 of the drawings, has the same thickness as the lap portion 9.

To install the rings 10, the conventional method is followed, wherein the rings are expanded over the head of the piston 13 until they register with the annular grooves provided to receive the same. In this position, the tongue 8 snugly fills the pocket 12, and thereafter expands and contracts to compensate for the variability of the bore of the cylinder 14. It is obvious that during the expansion and contraction of the rings, when thus constructed and when in service, the passage between the free ends of the ring is completely and entirely sealed, and that the lines of application of the force and resistance thereto are tortuous and for that reason extra resisting. Thus it will be seen that if the gas or oil endeavors to pass the joint, as shown in Fig. 2, from above, or from the explosion chamber of the cylinder 14, the same is caught in the space *a* between the ends of the lap portion 9 and the end of the sides forming the pocket 12. The body of the tongue 8 rests against the side of the cylinder and prevents the passage thereover of said gas or oil. It will be seen that should gas or oil be forced between the upper edge of the tongue 8 and the edge of the pocket 12, into the end of the same, it will remain there. To eject this accumulation in the end of the pocket 12, sufficient force is needed to drive the same between the lower edge of the tongue 8 and the side of said pocket. The force which is applied at the upper side of the tongue 8 to move the accumulation is equally effective in closing the passage at the lower side of the tongue.

Claim:
A single piece packing ring having one end formed with an overlap and the other end formed with an underlap, the overlap formed with a tongue projecting beyond its end, and a pocket formed in the upper face of the other end of the ring intermediate the sides thereof beyond which the underlap projects and into which pocket the tongue extends.

In testimony whereof we have signed our names to this specification in the presence of two subscribing witnesses.

CARL H. ENDEBROCK.
WILLIAM H. MAHLOW.

Witnesses:
 GARDNER H. CAIN,
 CLARENCE E. STILWELL.